W. STUEBING, Jr., AND H. A. VAN GUELPEN.
LIFTING TRUCK.
APPLICATION FILED MAR. 16, 1920.

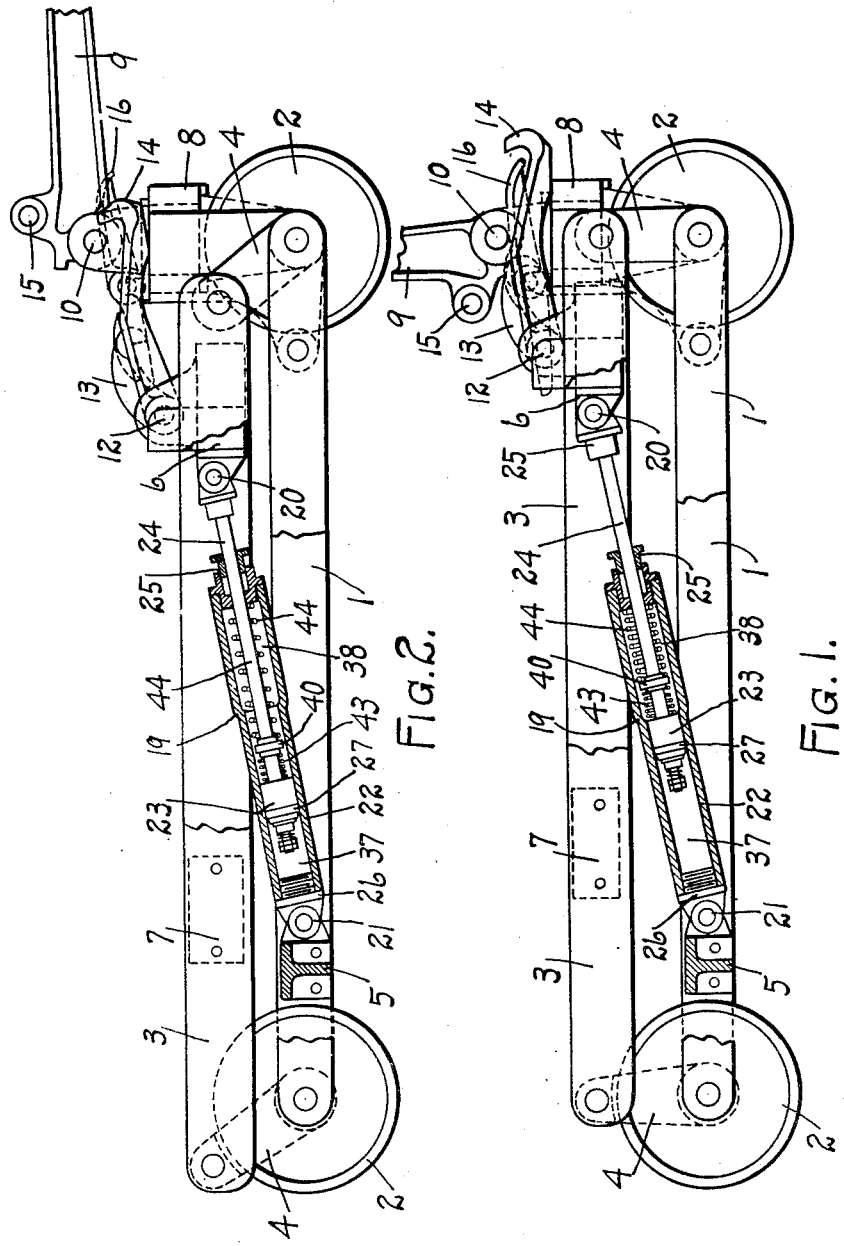

1,427,764.

Patented Aug. 29, 1922.
2 SHEETS—SHEET 2.

INVENTORS
William Stuebing Jr.
and Herman A. VanGuelpen
by John W. Krehli ATTORNEY.

UNITED STATES PATENT OFFICE.

WILLIAM STUEBING, JR., AND HERMAN A. VAN GUELPEN, OF CINCINNATI, OHIO, ASSIGNORS TO THE STUEBING TRUCK COMPANY, A CORPORATION OF OHIO.

LIFTING TRUCK.

1,427,764.

Specification of Letters Patent. Patented Aug. 29, 1922.

Application filed March 16, 1920. Serial No. 366,359.

*To all whom it may concern:*

Be it known that we, WILLIAM STUEBING Jr., and HERMAN A. VAN GUELPEN, each citizens of the United States, and each residing at the city of Cincinnati, in the county of Hamilton and State of Ohio, have invented certain new and useful Improvements in Lifting Trucks, of which the following is a specification.

Our invention relates more particularly to the "check mechanism" of lifting trucks, by means of which the load is allowed to descend slowly and is cushioned while descending, so that said load will not fall with a thud.

The platform is also assisted in its descent by this mechanism, when empty, so that no extraneous means or effort is needed to lower the empty lifting truck platform or upper frame.

Lifting trucks of this class have a lower wheeled base frame and an elevating frame mounted thereon and capable of moving up and down thereon, the handle of the truck connected to the lifting platform by intermediate means, so that by pulling down the handle the elevating platform is raised and locked into such raised position; when it is desired to lower the platform, it is released from its locked position, and it is at this time that the check mechanism operates and allows said load to descend slowly and uniformly.

When a load is on the elevating platform the check operates to allow the load to descend steadily acting as a cushion or retarding element; however when the platform is empty, a great deal of time is lost in allowing the empty platform to descend as the load is too light and does not create downward pressure to a sufficient degree; but with our check mechanism, when said platform is empty, the same is lowered very rapidly, thus saving time as the next load can be taken quickly.

Figure 3:
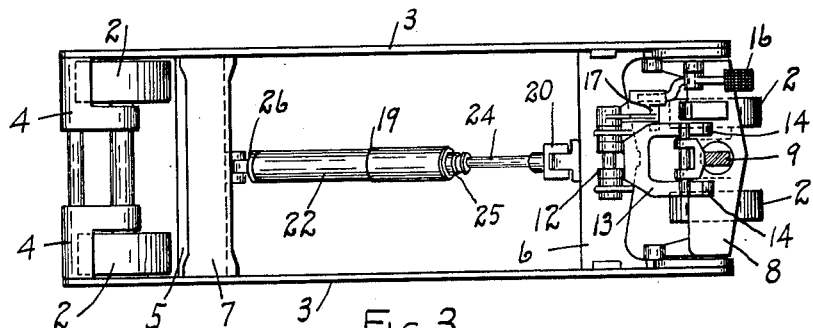
Figure 4:
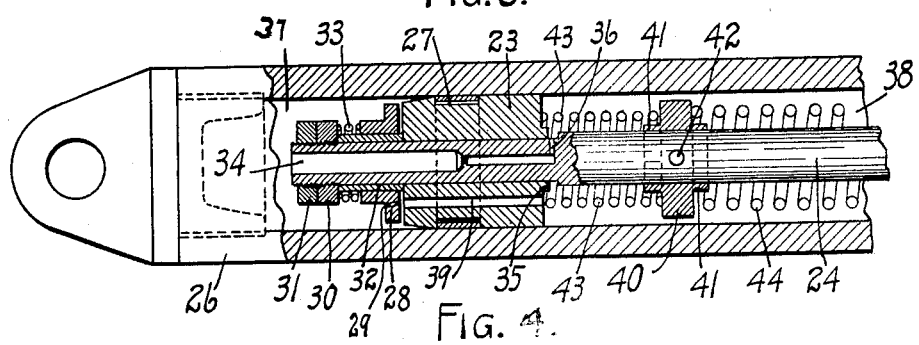
Figure 5:
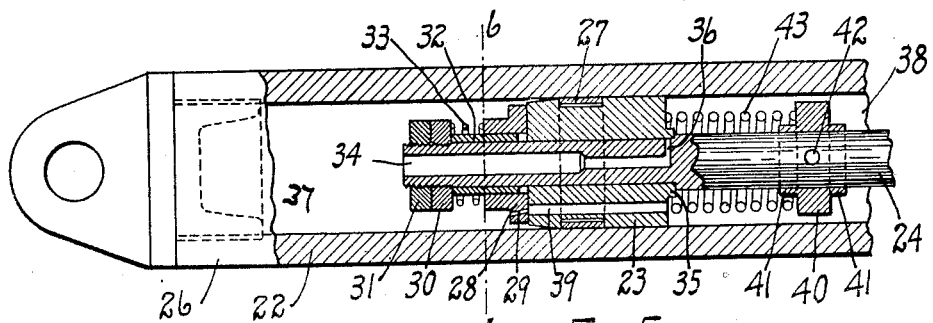
Figure 6:
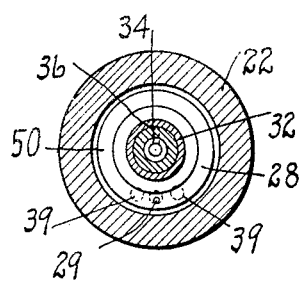

In the accompanying drawing, forming part of this specification:

Fig. 1, is a side elevation of a lifting truck, partly broken away, the check mechanism being shown partly in section, the elevating platform of the truck, shown in a raised position, the check parts shown in the position they occupy, when the truck is in elevated position;

Fig. 2, is a similar view, except that the elevating platform is lowering, and the parts of the check are showing in the position they occupy as said elevating platform is lowering, about half way down to its normal position, Fig. 3, is a plan view of a truck showing our invention attached thereto, Fig. 4, is a longitudinal section of the check mechanism, showing the position of the parts when the lifting platform is at its lowest position, or ready to be elevated, the check being partly broken away, Fig. 5, is a similar view, except that the check parts are in a different position, and Fig. 6, is a section taken on the line 6—6, of Fig. 5.

We will give a short description of a lifting truck; in the drawings.

The lower frame of the truck is marked 1 and it is supported on wheels 2; the upper frame or lifting platform is mounted on the lower frame and it is marked 3, link 4 connect the two platforms, and the elevating platform rises on said links. Braces 5 and 6 strengthen the lower and upper frame, respectively and the check is connected between said braces or cross pieces, a cross piece 7 being also used on the upper frame.

At the front of the truck a head piece 8 is present and in this head piece a handle 9 is swiveled and is also pivotally connected at 10; said handle being swiveled, by turning the same, the front wheels can be turned in steering the truck. At the point 12 a pivoted hook 13 is placed on the elevating platform 2 at its front end, the hook 13 has hooks 14. The handle is provided with pins 15. On the head 8 we put a pivoted treadle 16, provided with a finger 17, raising said link until engaged with said handle pins; the handle is then pulled down and the elevating platform 2 is elevated and automatically locked by any means into its elevated position; by raising the handle the link 13 drops out of position with the handle, leaving the truck free to be moved and steered.

By placing the foot upon the treadle 16, the platform 2 is released and descends to lowered position.

The check is marked 19 and at its forward end, is connected pivotally at 20 to brace or saddle 6 and at its rear extremity is connected to the brace or cross piece 5 at the pivoted point 21.

The check 19 is composed of a cylinder 22, generally made longer at its forward end as shown. In this cylinder 22 we place a piston 23 connected to a piston rod 24; and this piston rod is connected to the brace or saddle 6, which is one load of the check device. At the head of the cylinder 22, we place a stuffing box 25, and at its opposite end the cylinder is closed by a screw threaded plug 26.

The piston 23 works slidably in the cylinder 22 and an expansion ring 27 is placed around the same, to make it leak proof and this ring slides with the piston. Next to the piston 23, at its rear end we place rod a circular or cylindrical valve 28 provided with a seepage hole 29.

At the inner end of the piston rod 24, I place a nut 30 and a lock nut 31. Between the nut 30 and the end of valve 28, around the piston rod 24, we place a collar 32, a spring 33 being placed between nut 30 and valve 28, to keep the valve closed.

In the piston rod 24, at its inner end we place a hole 34 which extends up to the shoulder 35 on the piston rod, at which point is placed a by-pass 36 and through this hole 34 and by-pass 36 the oil from space 37 to space 38 at the other end of the cylinder 22. The oil passes from space 38 in the cylinder back to space 37 through three by-passes 39. On the piston rod 24, we place the collar 40, widest at the middle and having at each side shoulders 41 and around these shoulders, the springs in the device are guided or held; the collar being held in place by a pin 42.

Between this collar 40 and the piston 23 and around the piston rod, we place coiled spring 43, and between said collar and stuffing box 25, we place, around the piston rod 24, the coiled spring 44.

Where the elevating or upper platform is raised, the piston rod 24 is pulled out and rises upwardly and forwardly as shown, this pulls or forces the piston 23, collar 40, and all the parts connected back of the piston in the same direction as the piston rod, this places a stress upon the spring 44, the spring 43 is always stressed between the collar 40 and the piston 23. When this forward action of the parts in the cylinder takes place the oil in the space 38 passes through holes 39 back into space 37, the parts remaining in the position shown in Fig. 1, at which position the elevating platform is locked in elevating position. When the truck platform is lowered, and is carrying a weight, the stress on spring 44 relaxes and the spring 43 is compressed still more and the vent hole or by-pass 36 is closed, by reason of the piston 23 coming up and closing it, this forces the oil in space 37 to pass through by-pass 29 and through the holes 39, this retards the oil from fast movement and therefore acts as a cushion to allow the loaded platform to descend without a thud. To facilitate this action of the oil from the space 37 and to be positive that the oil reaches the holes 39, the end of piston 23 has a groove as 50 cut therein (see Fig. 6.)

When the platform is not loaded, it is always desirous to drop it quickly, so that no time be lost in waiting for its slow descent.

In our device the construction is such that when there is no load on platform, the spring 43 keeps the vent or by-pass 36 open as there is not enough oil pressure in space 37 to close the vent or by-pass, thus the oil from space 37 moves quickly through said large space 34 out through by-pass or vent 36 into space 38, thus encountering no resistance, therefore the empty platform and upper elevating frame drop quickly and the truck can at once be raised, thus saving time and making the lifting truck more valuable.

The pressure spring 43 is set, in the first instance, to counteract the weight of the wooden or other platform and the weight of the top frame of the truck plus the friction of the piston ring 27.

This checking device can be used on many different forms of lifting truck, which are well known in the art.

We do not wish to limit ourselves to the precise form and specific construction here- in shown and described, but we may make modifications thereof, which will still fall within the scope of our invention as set forth in this application.

What we claim as new and our invention and desire to secure by Letters Patent is:

1. In a lifting truck check mechanism, a cylinder, a piston located therein, a piston rod extending into said cylinder and connected to the piston, said cylinder and piston rod suitably connected to allow the piston rod to operate forward and backward, a collar on said piston rod and a spring arranged around said piston rod and between the collar and the piston, a passage way extending through the piston rod and connected by a by-pass to the space in the cylinder ahead of the piston and a passage way through said piston, a valve located in rear of the piston, having a small by-pass leading to the passage way through the piston, said parts so arranged that when a load or great pressure is on the piston, the liquid in the cylinder will pass through the openings in the piston and valve slowly to form a retarding cushion and when the pressure is slight against the piston, the liquid will pass through the by-pass and opening in the piston rod, by reason of the spring holding the piston back of the by-pass in the piston rod.

2. In a lifting truck check mechanism, a cylinder, piston and piston rod, a valve in the rear of the piston, a passage way leading from the rear of the cylinder to the forward part of the cylinder through the piston rod, and a passage way from the back of the cylinder to the forward part thereof through the valve and piston, the liquid in the cylinder passing through the passage way in the valve and piston when the pressure of the liquid in the rear of the cylinder is great and when the said pressure is light, the liquid passing through the passage way in the piston rod.

In testimony whereof, we affix our signatures at Cincinnati, Ohio, this 12th day of March, 1920.

WILLIAM STUEBING, JR.
HERMAN A. VAN GUELPEN.